United States Patent
Shiota et al.

(10) Patent No.: US 10,562,528 B2
(45) Date of Patent: Feb. 18, 2020

(54) VEHICLE TRAVEL ASSIST DEVICE

(71) Applicant: ADVICS CO., LTD., Kariya-shi (JP)

(72) Inventors: Masaki Shiota, Kariya (JP); Yosuke Ohmori, Kariya (JP); Yukio Mori, Kariya (JP); Yosuke Yamada, Nagoya (JP)

(73) Assignee: ADVICS CO., LTD., Kariya-shi (JP)

( * ) Notice: Subject to any disclaimer, the term of this patent is extended or adjusted under 35 U.S.C. 154(b) by 30 days.

(21) Appl. No.: 15/764,373

(22) PCT Filed: Sep. 29, 2016

(86) PCT No.: PCT/JP2016/078919
§ 371 (c)(1),
(2) Date: Mar. 29, 2018

(87) PCT Pub. No.: WO2017/077794
PCT Pub. Date: May 11, 2017

(65) Prior Publication Data
US 2018/0281787 A1     Oct. 4, 2018

(30) Foreign Application Priority Data

Nov. 6, 2015   (JP) ................................ 2015-218705

(51) Int. Cl.
*B60W 30/095*     (2012.01)
*B62D 6/00*       (2006.01)
(Continued)

(52) U.S. Cl.
CPC ........... *B60W 30/0956* (2013.01); *B60T 7/12* (2013.01); *B60T 8/17557* (2013.01);
(Continued)

(58) Field of Classification Search
CPC ....... B60W 30/0956; B60W 30/18163; B60W 30/095; B60W 40/109; B60W 2720/12;
(Continued)

(56) References Cited

U.S. PATENT DOCUMENTS 9,096,266 B2 *  8/2015  Irie ..................... B60W 30/10
2009/0240413 A1 * 9/2009  Miyajima ......... B60W 50/0098
                                                    701/70
(Continued)

FOREIGN PATENT DOCUMENTS

DE   10 2010 051 203 A1   5/2012
DE   10 2013 214 225 A1   1/2015
(Continued)

OTHER PUBLICATIONS

Machine Translation of JP 2015-114744 retrieved from Espacenet on Jun. 23, 2019. (Year: 2019).*
(Continued)

*Primary Examiner* — Thomas Ingram
(74) *Attorney, Agent, or Firm* — Oblon, McClelland, Maier & Neustadt, L.L.P.

(57) ABSTRACT

A vehicle travel assist device which enables setting of a target travel route while limiting the increase in computational load including an automatic drive control device is provided with: a storage unit that stores a map indicating the relation between a limit value of variation in lateral acceleration and time; a profile creation unit that, when information specifying a target position is inputted, creates a lateral acceleration profile indicating the relation between the lateral acceleration of a vehicle and time on the basis of the target position, an estimated time of arrival, and the map stored in the storage unit; and a target deriving unit that
(Continued)

derives a target travel route leading to the target position by performing integration twice on the created lateral acceleration profile.

4 Claims, 9 Drawing Sheets

(51) Int. Cl.
  *B60T 7/12* (2006.01)
  *B60W 40/109* (2012.01)
  *G08G 1/16* (2006.01)
  *B60T 8/1755* (2006.01)
  *B60W 30/18* (2012.01)
  *G05D 1/02* (2006.01)

(52) U.S. Cl.
  CPC ....... *B60T 8/17558* (2013.01); *B60W 30/095* (2013.01); *B60W 30/18163* (2013.01); *B60W 40/109* (2013.01); *B62D 6/00* (2013.01); *G05D 1/0214* (2013.01); *G08G 1/16* (2013.01); *B60T 2201/16* (2013.01); *B60W 2550/402* (2013.01); *B60W 2720/12* (2013.01)

(58) Field of Classification Search
  CPC .......... B60W 2550/402; B60T 8/17558; B60T 8/17557; B60T 7/12; B60T 2201/16; B62D 6/00; G06D 1/0214; G08G 1/16
  See application file for complete search history.

(56) References Cited

U.S. PATENT DOCUMENTS

| | | | |
|---|---|---|---|
| 2009/0319113 A1* | 12/2009 | Lee | B62D 15/025 |
| | | | 701/25 |
| 2010/0235035 A1 | 9/2010 | Nishira et al. | |
| 2017/0015204 A1* | 1/2017 | Oguri | B60L 7/18 |
| 2017/0349173 A1* | 12/2017 | Nishiguchi | B60W 30/09 |
| 2018/0238696 A1* | 8/2018 | Takeda | G01C 21/26 |
| 2018/0348767 A1* | 12/2018 | Jafari Tafti | B60W 30/0956 |
| 2019/0071093 A1* | 3/2019 | Ma | B60W 30/18163 |

FOREIGN PATENT DOCUMENTS

| | | |
|---|---|---|
| DE | 10 2014 206 338 A1 | 10/2015 |
| JP | 7-179140 A | 7/1995 |
| JP | 2007-253745 A | 10/2007 |
| JP | 2015-114744 A | 6/2015 |

OTHER PUBLICATIONS

International Search Report dated Dec. 27, 2016, in PCT/JP2016/078919, filed Sep. 29, 2016.

Extended European Search Report dated Jun. 3, 2019 in Patent Application No. 16861862.7, 9 Pages.

* cited by examiner

LATERAL ACCELERATION Ay

LATERAL SPEED Vy

LATERAL DISTANCE Ly

VEHICLE TRAVEL ASSIST DEVICE

TECHNICAL FIELD

The present invention relates to a vehicle travel assist device which sets a target travel route of a vehicle to a target position different from the vehicle in a vehicle lateral direction.

BACKGROUND ART

Patent Document 1 describes an example of a vehicle travel assist device that sets the target travel route for avoiding collision with an obstacle located in front of the vehicle. In the travel assist device described in Document 1, when it is detected that an obstacle is present in front of the vehicle, a plurality of travel routes which avoids the obstacle is derived. Further, each travel route is evaluated with a plurality of items, respectively, and the travel route having the best evaluation result among the travel routes is set as the target travel route. Further, Patent Document 1 discloses an approaching state between the vehicle and the obstacle, an approaching state between a boundary portion of the road and the vehicle, and the like, as the evaluation items.

CITATION LIST

Patent Document

Patent Document 1: JP-A-2007-253745

SUMMARY OF THE INVENTION

Technical Problem

Incidentally, in the travel assist device, when setting the target travel route, it is necessary to derive a plurality of travel routes and then to evaluate each travel route with a plurality of items, and a computational load for setting the target travel route rises.

An object of the invention is to provide a vehicle travel assist device capable of setting a target travel route, while suppressing an increase in computational load.

Solution to Problem

A vehicle travel assist device for solving the above problem is a device for setting a target travel route of a vehicle to a target position different from a vehicle in a vehicle lateral direction. The vehicle travel assist device includes: a storage unit which stores a parameter relating to an amount of change in a lateral acceleration of the vehicle; a profile creation unit which creates a lateral acceleration profile indicating a relation between the lateral acceleration of the vehicle and the time, on the basis of the target position, an arrival prediction time which is a predicted value of the time required for the vehicle to reach the target position, and the parameter stored in the storage unit, when information specifying the target position is input; and a target deriving unit which integrates the created lateral acceleration profile twice to derive a target travel route up to the target position.

According to the above configuration, when information specifying the target position is input, a lateral acceleration profile indicating the relation between the lateral acceleration of the vehicle and the time is created. This lateral acceleration profile is an index of a change in the lateral acceleration up to the arrival prediction time. By integrating the lateral acceleration profile twice, a profile is created which is an index of a change in lateral distance, which is the amount of movement of the vehicle in the lateral direction, up to the arrival prediction time, and the profile can be set to the target travel route up to the target position. That is, by acquiring the target position, it is possible to create a plurality of travel routes and to set the target travel route, without evaluating the plurality of travel routes with a plurality of items. Therefore, it is possible to set the target travel route, while suppressing an increase in computational load.

Further, in the vehicle travel assist device, when the information specifying the target position and the information specifying the transit position located between the vehicle and the target position are input, the profile creation unit preferably creates a lateral acceleration profile in an aspect in which a percentage of the predicted time which is a predicted value of the time required for the vehicle to reach the transit position among the arrival predicted times is smaller, as the transit position is closer to the current position of the vehicle in the vehicle front-rear direction. In this case, the target deriving unit can derive a target travel route in an aspect in which the vehicle reaches the target position via the transit position, by integrating the lateral acceleration profile created by the profile creation unit twice. According to this configuration, even if the target position is the same, it is possible to derive the target travel route according to the specified transit position. That is, the degree of freedom in setting of the target travel route can be increased.

Further, in the vehicle travel assist device, when information specifying the target position, and information specifying a final posture angle of the vehicle which is a posture angle of the vehicle at the time when the vehicle reaches the target position are input, the profile creation unit preferably creates the lateral acceleration profile, on the basis of the target position, the final posture angle, the arrival prediction time, and the parameter stored in the storage unit. In this case, the target deriving unit preferably derives a target travel route in an aspect in which the posture angle of the vehicle reaching the target position becomes the final posture angle, by integrating the lateral acceleration profile created by the profile creation unit twice. Further, the posture angle of the vehicle is a rotation angle of the vehicle that changes by the yawing motion of the vehicle. The final posture angle is a relative rotation angle based on the posture angle of the vehicle before the start of travel along the target travel route, and is the target value of the posture angle of the vehicle at the time the vehicle reaches the target position.

According to the above configuration, even if the target position is the same, it is possible to derive the target travel route according to the specified final posture angle. That is, the degree of freedom in setting of the target travel route can be enhanced.

Here, as a case where the setting of the target travel route is required, it is possible to adopt the case of causing the vehicle to travel so as to avoid an obstacle existing in front of the vehicle, the case of causing the vehicle to travel on the curved lane (lane), and the case of changing the lane in which the vehicle travels, and the like. Further, for example, when the obstacle moves or the curvature of the curve of the road changes, while the vehicle travels along the target travel route, the target position may change. When the target position is thus changed, it may be necessary to reset the target travel route.

Thus, in the vehicle travel assist device, when the information indicating the change in the target position is input under a condition that the vehicle traveling along the target travel route derived by the target deriving unit has not yet reached the target position, the profile creation unit preferably creates a lateral acceleration profile, on the basis of the target position after the change, the arrival prediction time which is a predicted value of the time required for the vehicle to reach the target position after the change, and the parameter stored in the storage unit. According to this configuration, in the target deriving unit, by integrating the new lateral acceleration profile created by the profile creation unit twice, it is possible to derive the target travel route up to the target position after the change. When the target position is thus changed, since the target travel route is reset, it is possible to make the travel assistance of the vehicle more appropriate.

Further, in the vehicle travel assist device, it is possible to set the target travel route, while suppressing an increase in computational load. Therefore, when the target position is changed, a new target travel route can be set early.

MODE FOR CARRYING OUT THE INVENTION

Hereinafter, an embodiment of a vehicle travel assist device will be described with reference to FIGS. 1 through 13.

Figure 1:
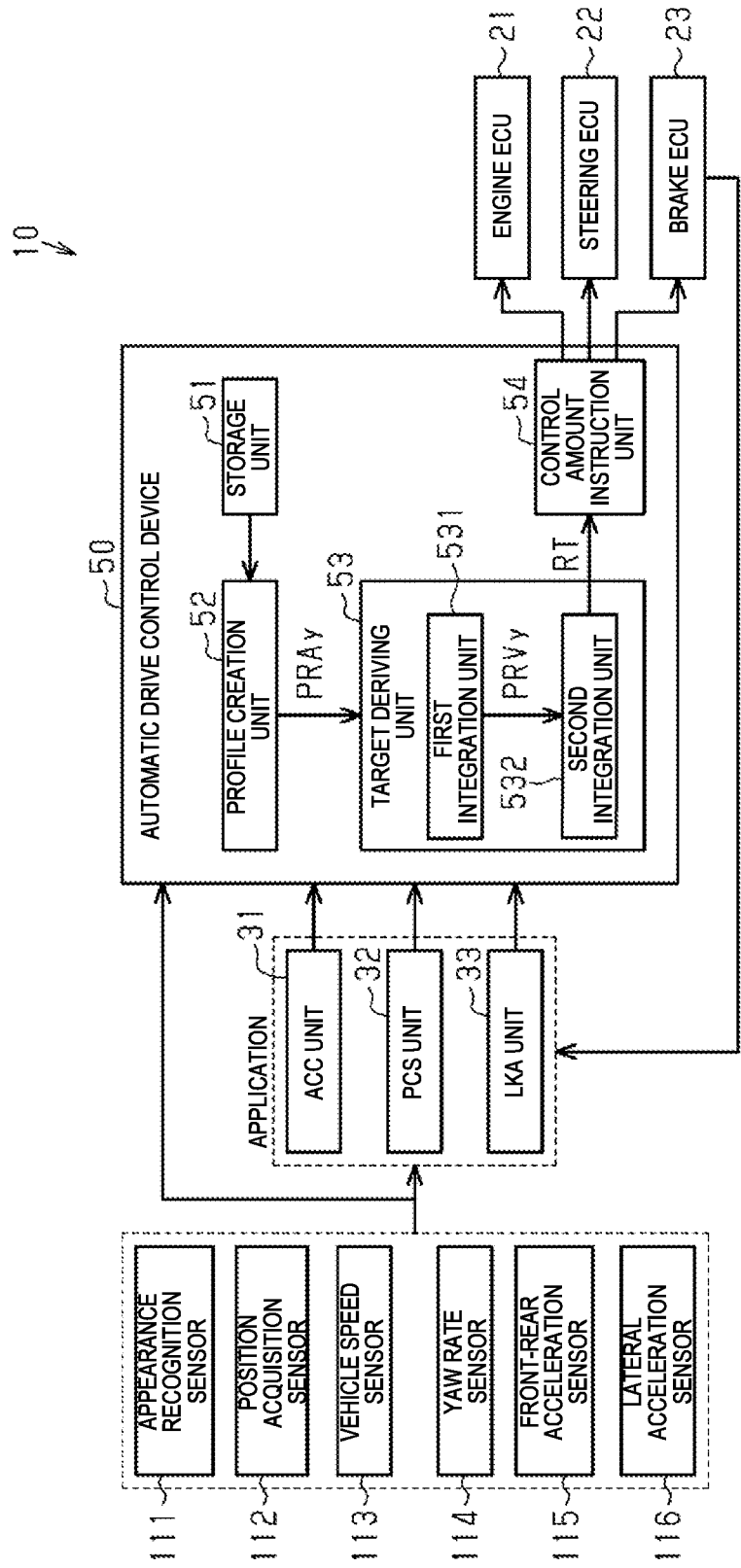
FIG. 1 is a block diagram illustrating a schematic configuration of an automatic drive assist system equipped with an automatic drive control device which is an embodiment of the vehicle travel assist device.

FIG. 1 illustrates an automatic drive assist system 10 including an automatic drive control device 50 which is a vehicle travel assist device according to this embodiment. In the automatic drive assist system 10, various assist controls for assisting the automatic driving of the vehicle are performed. In the assist control, a target travel route RT is set in accordance with the situation (the curvature of the curve, etc.) of the road on which the vehicle is traveling, and the presence or absence of an obstacle in front of the vehicle, and the vehicle can be allowed to travel along the target travel route RT. Examples of "assist control" include an adaptive cruise control (hereinafter referred to as "ACC"), a pre-crash safety system (hereinafter referred to as "PCS"), a lane keep assist (hereinafter referred to as "LKA"), and the like.

As illustrated in FIG. 1, an appearance recognition sensor 111 and a position acquisition sensor 112 are electrically connected to the automatic drive assist system 10. The appearance recognition sensor 111 is a detection system for detecting the presence and absence of the obstacle (another vehicle, a pedestrian, a guard rail, etc.) in front of the vehicle, a distance between the vehicle and an obstacle, and the like, and is configured to include an imaging device such as a camera, a millimeter wave radar and the like. The position acquisition sensor 112 is a sensor that acquires the position of the vehicle, and for example, a GPS sensor can be adopted. The "GPS" is an abbreviation of "Global Positioning System".

Figure 2:
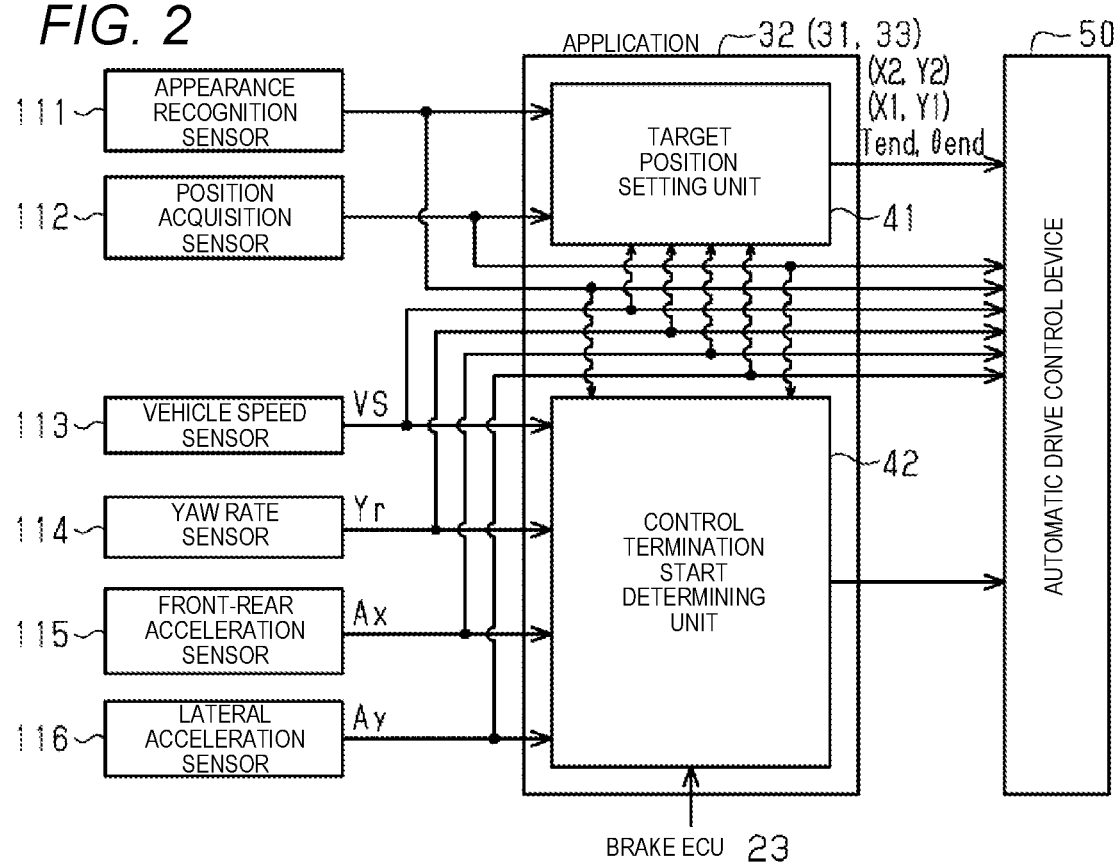
FIG. 2 is a block diagram illustrating a functional configuration of a PCS unit which is an example of an application for assist control and its peripheral configuration in the automatic drive assist system.

Further, as illustrated in FIGS. 1 and 2, as a detection system for detecting the state of the vehicle, a vehicle speed sensor 113, a yaw rate sensor 114, a front-rear acceleration sensor 115, and a lateral acceleration sensor 116 are connected to the automatic drive assist system 10. The vehicle speed sensor 113 is a detection system for detecting the vehicle body speed VS of the vehicle, and for example, a sensor for detecting the rotational speed of the wheel can be adopted. The yaw rate sensor 114 is a detection system for detecting the yaw rate Yr of the vehicle. The front-rear acceleration sensor 115 is a detection system for detecting the front-rear acceleration Ax which is the acceleration in the front-rear direction of the vehicle, and the lateral acceleration sensor 116 is a detection system for detecting the lateral acceleration Ay which is the lateral acceleration of the vehicle.

Further, an engine ECU 21 for controlling an engine which is a power source of the vehicle, a steering ECU 22 for controlling a steering angle of the wheels of the vehicle, and a brake ECU 23 for controlling a braking device of the vehicle are electrically connected to the automatic drive assist system 10. The automatic drive assist system 10 is adapted to output to the ECUs 21 to 23 a control amount necessary for automatic driving accompanied by assist control of PCS or the like. FIG. 1 illustrates an example in which a difference in braking force is generated between a right wheel and a left wheel of the vehicle, thereby controlling an advancing direction thereof, that is, the posture angle θ of the vehicle. The "posture angle θ of the vehicle" referred to here is the rotation angle of the vehicle which changes by the yawing motion of the vehicle.

As illustrated in FIG. 1, the automatic drive assist system 10 includes an ACC unit 31, a PCS unit 32, and an LKA unit 33 as applications for assist control. The ACC unit 31 creates information necessary for execution of the ACC, and outputs this information to the automatic drive control device 50. The PCS unit 32 creates information necessary for execution of the PCS, and outputs the information to the automatic drive control device 50. The LKA unit 33 creates information necessary for execution of the LKA, and outputs the information to the automatic drive control device 50.

In FIG. 2, the functional configuration of the PCS unit 32, which is an example of an application for assist control, is illustrated. As illustrated in FIG. 2, the PCS unit 32 includes a target position setting unit 41 and a control termination start determining unit 42. Information is input to the target position setting unit 41 from the appearance recognition sensor 111 and the position acquisition sensor 112. Further, the target position setting unit 41 sets at least the target position (X2, Y2) among the target position (X2, Y2) and the transit position (X1, Y1), and an arrival prediction time Tend, and outputs information specifying the setting contents to the automatic drive control device 50. Further, the target position setting unit 41 may set a final posture angle θend depending on the condition of the road on which the vehicle is traveling, and may output the information specifying the final posture angle θend to the automatic drive control device 50.

The target position (X2, Y2) is a position different from the current position (X0, Y0) of the vehicle in the lateral direction of the vehicle, and is the final destination of automatic drive which can be set at the current time on the basis of the information that is input from the appearance recognition sensor 111. For example, the target position (X2, Y2) set by the PCS is a position at which it is possible to determine that a collision with an obstacle as an avoidance target can be avoided. For example, the target position (X2, Y2) is a position adjacent to the obstacle in the lateral direction of the vehicle (a position indicated by a two-dot chain line in FIG. 5.)

Figure 5:
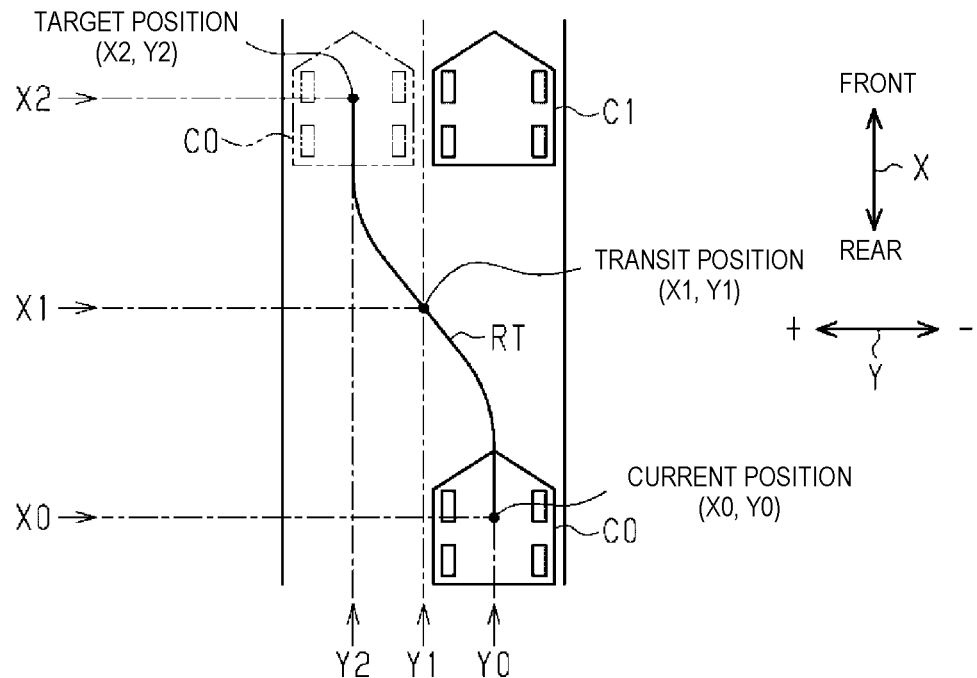
FIG. 5 is a schematic diagram illustrating a target travel route for causing the vehicle to perform a lane change.

Further, "X0" is the position in the front-rear direction at the current position of the vehicle (the position in the X direction illustrated in FIG. 5), and "Y0" is the lateral position at the current position of the vehicle (the position in the Y direction illustrated in FIG. 5). Further, "X2" is a relative position in the front-rear direction of the target position on the basis of the position X0 in the front-rear direction of the current position. Further, "Y2" is a relative lateral position of the target position on the basis of the lateral position Y0 of the current position.

The transit position (X1, Y1) is a position between the current position (X0, Y0) and the target position (X2, Y2) of the vehicle. That is, "X1" is a relative position in the front-rear direction of the transit position on the basis of the position X0 in the front-rear direction of the current position, and "Y1" is a relative position in the lateral direction of the transit position on the basis of the lateral position Y0 of the current position. Further, when setting the transit position (X1, Y1), the PCS unit 32 can request the automatic drive control device 50 to set the target travel route RT in manner of reaching the target position (X2, Y2) via the transit position (X1, Y1).

The arrival prediction time Tend is a predicted value of the time required for moving the vehicle from the current position (X0, Y0) of the vehicle to the target position (X2, Y2). The arrival prediction time Tend can be computed on the basis of a lateral acceleration Ay of the vehicle at the current time, the yaw rate Yr, the vehicle body speed VS, and the like. For example, when performing the PCS, by setting the lateral position of the vehicle to be equal to the lateral position Y2 of the target position up to the set arrival prediction time Tend, it is possible to avoid collision between the vehicle and the obstacle.

The final posture angle θend is a target value of the posture angle of the vehicle when the vehicle traveling along the target travel route RT reaches the target position (X2, Y2). The final posture angle θend is a relative rotation angle on the basis of the posture angle of the vehicle when setting the target travel route RT. Therefore, when the posture angle of the vehicle when setting the target travel route RT is set to be the same as the posture angle of the vehicle when reaching the target position (X2, Y2), the final posture angle θend is set to "0 (zero)".

When the PCS is not being executed, the control termination start determining unit 42 determines whether it is necessary to execute the PCS. For example, when the target position (X2, Y2) set by the target position setting unit 41 changes, the control termination start determining unit 42 outputs a start request of the PCS to the automatic drive control device 50. Further, when the PCS is being executed, the control termination start determining unit 42 determines whether or not the PCS may be terminated, on the basis of the information which is input from the various sensors 111 to 116 or the information which is input from the brake ECU 23. For example, when the vehicle reaches the target position (X2, Y2), the control termination start determining unit 42 determines that the PCS may be terminated and outputs a termination request of the PCS to the automatic drive control device 50.

Here, as an example of the functional configuration of the application, the functional configuration of the PCS unit 32 has been described with reference to FIG. 2. The functional configuration of other applications (the ACC unit 31, the LKA unit 33, etc.) other than the PCS unit 32 is almost the same as the PCS unit 32, in that the target position (X2, Y2) and the arrival prediction time Tend (and the transit position (X1, Y1) and the final posture angle θend) are set, and a start request or termination request of assist control such as PCS is output. Therefore, description of the functional configuration of other applications other than the PCS unit 32 will not be provided.

As illustrated in FIG. 1, various kinds of information are input to the automatic drive control device 50 of the automatic drive assist system 10 from applications such as the ACC unit 31, the PCS unit 32, and the LKA unit 33. In the automatic drive control device 50, for example, a target travel route RT of the vehicle for changing the lateral position of the vehicle is created, and a control amount necessary for allowing the vehicle to travel along the target travel route RT is computed. Further, such a control amount is output from the automatic drive control device 50 to the brake ECU 23.

The automatic drive control device 50 has a storage unit 51, a profile creation unit 52, a target deriving unit 53, and a control amount instruction unit 54.

Figure 3A:
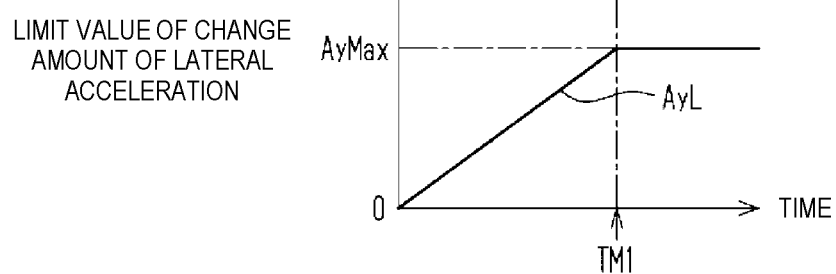
FIGS. 3(a) and 3(b) are maps illustrating a relation between a limit value of an amount of change in a lateral acceleration and the time.
Figure 3B:
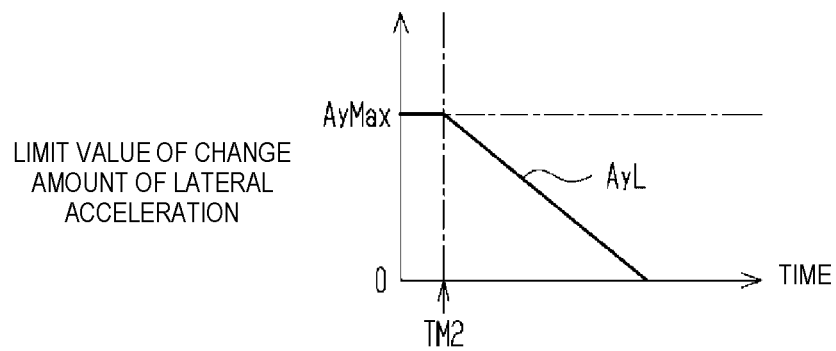

Maps illustrated in FIGS. 3(a) and 3(b) are stored in the storage unit 51 in advance. Each of these maps is a map illustrating a relation between the limit value AyL of the amount of change of the lateral acceleration and the time. That is, in this embodiment, the limit value AyL of the amount of change of the lateral acceleration corresponds to "parameter relating to the amount of change of the lateral acceleration of the vehicle".

The map illustrated in FIG. 3(a) is used at the start of assist control of the PCS or the like and when changing the change direction of the lateral acceleration Ay of the vehicle. The phrase "when changing the change direction of the lateral acceleration Ay" as used herein is just after shifting to the decreasing period when shifting from the increasing period which is the period of increasing the lateral acceleration Ay to the decreasing period of decreasing the lateral acceleration Ay, and just after shifting to the increasing period when shifting to the increasing period from the decreasing period.

As illustrated in FIG. 3(a), the limit value AyL of the amount of change of the lateral acceleration gradually increases as time elapses. The change gradient of the limit value AyL at this time, that is, the amount of change of the limit value AyL per unit time is set by the specifications of the vehicle. Further, when the time reaches a limit release time TM1, the limit value AyL becomes equal to an upper limit value AyMax of the lateral acceleration. Subsequently, the limit value AyL is held at the upper limit value AyMax. Further, the upper limit value AyMax of the lateral acceleration is set to a value equal to or slightly smaller than the actual upper limit value of the lateral acceleration that can be generated in the vehicle.

The map illustrated in FIG. 3(b) is used at the termination of assist control of the PCS or the like and when changing the change direction of the lateral acceleration Ay of the vehicle. The phrase "when changing the change direction in the lateral acceleration Ay" as used herein is just before shifting to the decreasing period when shifting from the increasing period to the decreasing period, and just before shifting to the increasing period when shifting from the decreasing period to the increasing period.

As illustrated in FIG. 3(b), the limit value AyL of the amount of change of the lateral acceleration is held at the upper limit value AyMax of the lateral acceleration until the time reaches a limit start time TM2. Further, after the time reaches the limit start time TM2, the limit value AyL gradually decreases as time elapses and eventually becomes equal to "0 (zero)". The change gradient of the limit value AyL at this time, that is, the amount of change of the limit value AyL per unit time is set by the specifications of the vehicle.

Figure 6A:
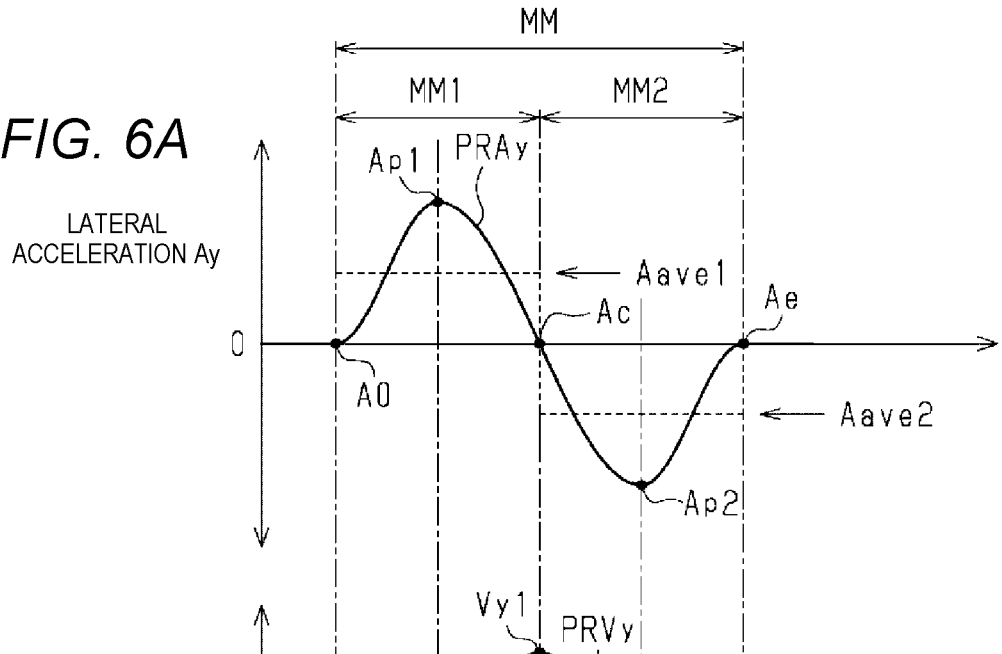
FIG. 6(a) is a diagram illustrating a lateral acceleration profile created when causing a vehicle to perform a lane change.

Returning to FIG. 1, when the information specifying the target position (X2, Y2) or the like is input from the application such as the PCS unit 32, the profile creation unit 52 creates a lateral acceleration profile PRAy representing a relation between the lateral acceleration Ay of the vehicle and time. As illustrated in FIG. 6(a), for example, the lateral acceleration profile PRAy represents an index of a change in the lateral acceleration Ay from the current time to the time at which the arrival prediction time Tend elapses. That is, the profile creation unit 52 creates the lateral acceleration profile PRAy on the basis of the target position (X2, Y2), the arrival prediction time Tend, and the map (see FIGS. 3(a) and 3(b)) stored in the storage unit 51 (See FIG. 6(a)). Also, when information specifying the transit position (X1, Y1) is input from the application, the profile creation unit 52 also creates the lateral acceleration profile PRAy in consideration of the transit position (X1, Y1). Also, when information specifying the final posture angle θend is input from the application, the profile creation unit 52 also creates the lateral acceleration profile PRAy in consideration of the final posture angle θend. Further, the profile creation unit 52 outputs the created lateral acceleration profile PRAy to the target deriving unit 53.

The target deriving unit 53 has a first integration unit 531 and a second integration unit 532. When the lateral acceleration profile PRAy is input from the profile creation unit 52, the first integration unit 531 performs the integration process on the lateral acceleration profile PRAy, thereby creating a lateral speed profile PRVy which indicates the relation between the lateral speed Vy of the vehicle and the time (see FIG. 6(b)). The lateral speed profile PRVy represents an index of a change in the lateral speed Vy from the current time to the time at which the arrival prediction time Tend elapses. Further, the lateral speed Vy mentioned here is a speed along the horizontal plane and in the lateral direction of the vehicle orthogonal to the front-rear direction of the vehicle at the current time and is the speed in the Y direction illustrated in FIG. 5.

Figure 6B:
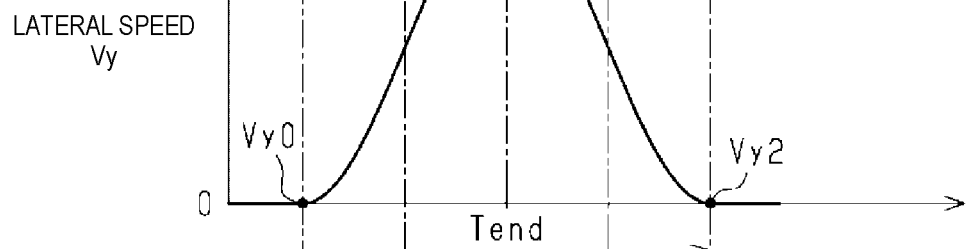
FIG. 6(b) is a diagram illustrating a lateral speed profile.
Figure 6C:
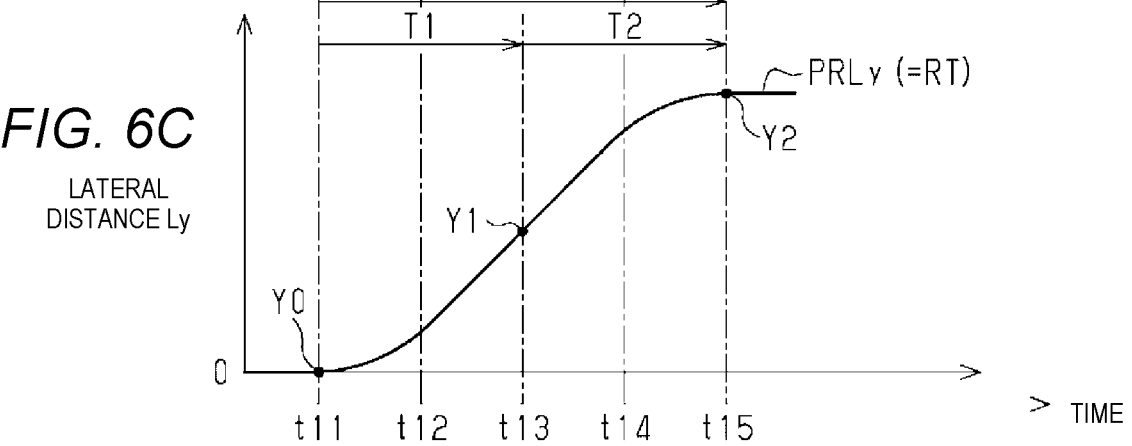
FIG. 6(c) is a diagram illustrating a lateral distance profile.

The second integration unit 532 performs the integration process on the lateral speed profile PRVy created by the first integration unit 531, thereby creating a lateral distance profile PRLy representing a relation between the lateral distance Ly and the time which is the movement amount in the lateral direction of the vehicle on the basis of the current position (X0, Y0) of the vehicle (see FIG. 6(c)). The lateral distance profile PRLy represents an index of a change in the lateral distance Ly from the current time to the time when the arrival prediction time Tend elapses. That is, the lateral distance profile PRLy corresponds to the target travel route RT from the current position (X0, Y0) of the vehicle to the target position (X2, Y2). That is, in the present embodiment, by integrating the lateral acceleration profile PRAy twice, it is possible to derive the target travel route RT from the current position (X0, Y0) of the vehicle to the target position (X2, Y2). Further, the second integration unit 532 outputs the target travel route RT thus derived to the control amount instruction unit 54.

The control amount instruction unit 54 computes a control amount for causing the vehicle to travel along the input target travel route RT. Specifically, the control amount instruction unit 54 computes a feed forward control amount on the basis of the target travel route RT, and computes a feed forward control amount on the basis of a deviation between the requested control amount obtained from the target travel route and the feed forward control amount. Further, the control amount instruction unit 54 outputs the respective control amounts to the brake ECU 23.

Next, a processing routine for setting the target travel route RT will be described with reference to the flowchart illustrated in FIG. 4. This processing routine is executed for each preset control cycle.

Figure 4:
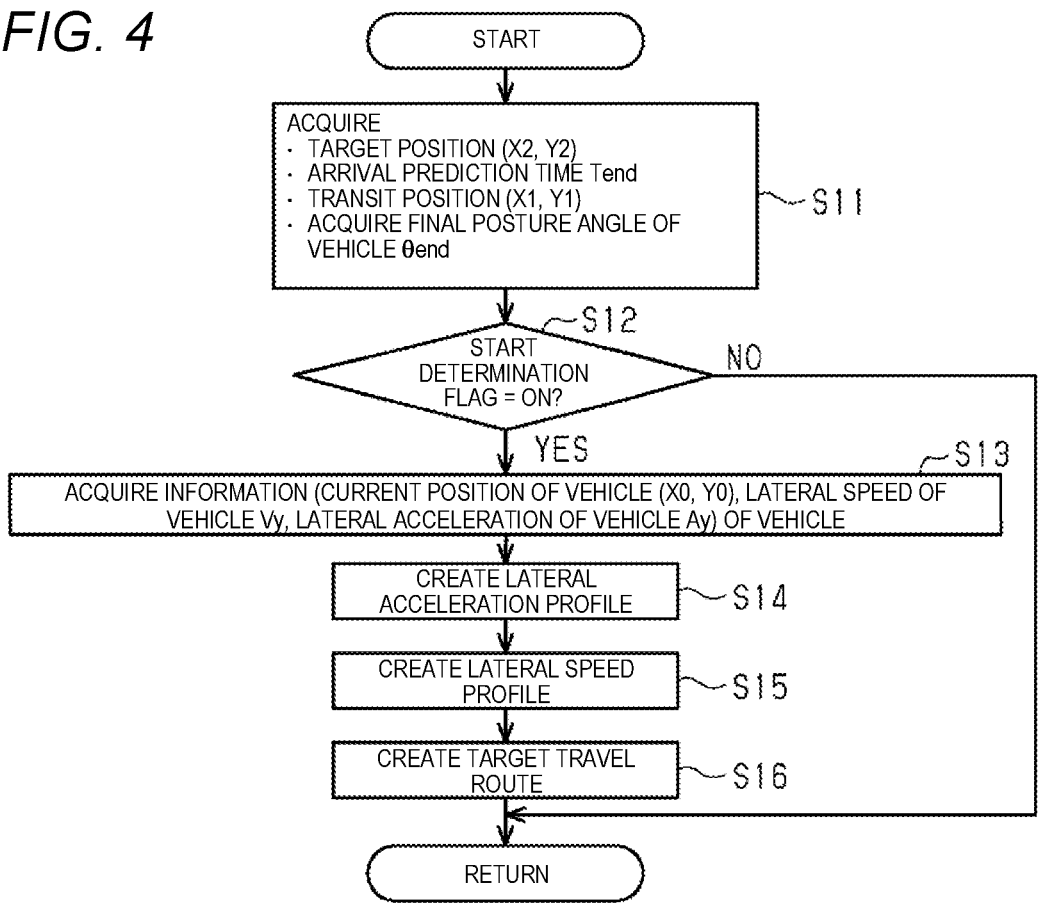
FIG. 4 is a flowchart illustrating a processing routine executed by the automatic drive control device for deriving a target travel route.

As illustrated in FIG. 4, in step S11, the profile creation unit 52 acquires the target position (X2, Y2), the arrival prediction time Tend, the transit position (X1, Y1), and the final posture angle θend. When information specifying the transit position (X1, Y1) is not input from the application such as the PCS unit 32, the profile creation unit 52 cannot acquire the transit position (X1, Y1). Likewise, when information specifying the final posture angle θend is not input from the application, the profile creation unit 52 cannot acquire the final posture angle θend.

In the next step S12, the profile creation unit 52 determines whether or not the start determination flag is set to ON. The start determination flag is set to ON when a start request of the assist control of PCS or the like is input from an application such as the PCS unit 32. The start determination flag is set to OFF when a determination request of the assist control is input from the application. Further, when the start determination flag is set to ON (step S12: YES), the process proceeds to step S13. On the other hand, when the start determination flag is set to OFF (step S12: NO), the processing routine is terminated without setting the target travel route RT.

In step S13, the profile creation unit 52 acquires the information of the vehicle, that is, the current position (X0, Y0) of the vehicle, the lateral speed Vy of the vehicle, and the lateral acceleration Ay of the vehicle. Further, in the next step S14, the profile creation unit 52 creates the lateral acceleration profile PRAy.

Here, the creation of the lateral acceleration profile PRAy when changing the traveling lane of the vehicle C0, that is, at the time of lane change will be described as an example with reference to FIGS. 5 and 6. Further, FIG. 5 illustrates a case where the vehicle C0 performs a lane change so as to avoid a collision with the front obstacle C1 (in this case, the preceding vehicle). In this case, it is assumed that the target position (X2, Y2), the transit position (X1, Y1), and the arrival prediction time Tend can be acquired, and meanwhile, the final posture angle θend cannot be acquired. Further, the transit position (X1, Y1) is set to be intermediate between the current position (X0, Y0) of the vehicle C0 and the target position (X2, Y2) in the vehicle front-rear direction which is the X direction illustrated in FIG. 5.

As illustrated in FIG. 6(a), a rough pattern of the lateral acceleration profile from the current time to the arrival prediction time Tend is set. That is, the profile pattern at the time of lane change is a shape that increases the lateral acceleration Ay, then decreases the lateral acceleration Ay, and then increases the lateral acceleration Ay. Further, the execution period MM of the assist control of the PCS or the like is divided into a plurality of sections in accordance with the set number of transit positions (X1, Y1). In the example illustrated in FIGS. 5 and 6, since only one transit position (X1, Y1) is set, the execution period MM is divided into two sections MM1, MM2. When two transit positions (X1, Y1) are set, the execution period MM is divided into three sections.

Subsequently, a temporal length T1 of the first section MM1, which is the first half section of the execution period MM, and a temporal length T2 of the second section MM2 which is a second half section of the execution period MM are computed, using the following relational expressions (Expression 1), (Expression 2) and (Expression 3). The sum of the temporal length T1 of the first section MM1 and the temporal length T2 of the second section MM2 is equal to the temporal length of the execution period MM, that is, the arrival prediction time Tend.

[Formula 1]

$$Y1 = \frac{D}{10} \times Y2 \quad \text{(Expression 1)}$$

$$T1 = \frac{D}{10} \times \text{Tend} \quad \text{(Expression 2)}$$

$$T2 = \left(1 - \frac{D}{10}\right) \times \text{Tend} \quad \text{(Expression 3)}$$

When the transit position (X1, Y1) is set to be intermediate between the current position (X0, Y0) of the vehicle and the target position (X2, Y2) in the vehicle front-rear direction, as it is obvious from the relational expression (Expression 1), "D" becomes "5". On the other hand, when the transit position (X1, Y1) is closer to the target position (X2, Y2) than the current position (X0, Y0) of the vehicle in the vehicle front-rear direction, "D" becomes larger than "5". Further, when the transit position (X1, Y1) is closer to the current position (X0, Y0) of the vehicle than the target position (X2, Y2) in the vehicle front-rear direction, "D" becomes smaller than "5". That is, the ratio "D/10" occupied by the predicted time (T1), which is the predicted value of the time required for the vehicle to reach the transit position (X1, Y1), of the arrival prediction time Tend, becomes smaller, as the transit position (X1, Y1) is closer to the current position (X0, Y0) in the vehicle front-rear direction. When "D" is "5", the temporal length T1 of the first section MM1 becomes equal to the temporal length T2 of the second section MM2, and meanwhile, when "D" is not "5", the temporal length T1 of the first section MM1 and the temporal length T2 of the second section MM2 are different from each other.

An average value Aave1 of the lateral acceleration of the vehicle in the first section MM1 can be computed, using the following relational expression (Expression 4). Further, an area of a portion surrounded by the solid line illustrating the temporal transition of the lateral acceleration Ay in the first section MM1 can be regarded to be equal to the product of the average value Aave1 of the lateral acceleration and the temporal length T1 of the first section MM1 as indicated by the broken line in FIG. 6(a). Further, the area can be expressed by the following relational expression (Expression 5). In the relational expression (Expression 5), "Ap1" is a maximum value of the lateral acceleration of the vehicle at the first section MM1, "A0" is the lateral acceleration of the vehicle at the start time of the first section MM1, and "Ac" is the lateral acceleration of the vehicle at the termination time of the first section MM1. In the examples illustrated in FIGS. 5 and 6, the lateral acceleration Ac of the vehicle at the termination time of the first section MM1 is equal to the lateral acceleration A0 of the vehicle at the start time of the first section MM1.

[Formula 2]

$$Aave1 = \frac{2 \times (Y1 - Y0 - V_y0 \cdot T1)}{T1^2} \quad \text{(Expression 4)}$$

$$Aave1 \cdot T1 = (A0 + Ap1) \cdot \frac{T1}{2} \cdot \frac{1}{2} + (Ap1 + Ac) \cdot \frac{T1}{2} \cdot \frac{1}{2} \quad \text{(Expression 5)}$$

Further, the above relational expression (Expression 4) can be converted into the following relational expression (Expression 6). Further, the lateral position Y0 of the current position of the vehicle C0, the lateral position Y1 of the transit position, and the lateral speed Vy0 of the vehicle at the current time have already been acquired, and the temporal length T1 of the first section MM1 can be computed, using the above-mentioned relational expressions (Formula 1) and (Formula 2). By substituting these parameters into the relational expression (Expression 6), the maximum value Ap1 of the lateral acceleration of the vehicle at the first section MM1, that is, the required value of the lateral acceleration at the second timing t12 is obtained.

[Formula 3]

$$Ap1 = \frac{4 \times (Y1 - Y0 - V_y0 \cdot T1)}{T1^2} - \frac{1}{2} \cdot (A0 - Ac) \quad \text{(Expression 6)}$$

Further, the average value Aave2 of the lateral acceleration of the vehicle at the second section MM2 can be computed, using the following relational expression (Expression 7). Further, at the second section MM2, the area of the portion surrounded by the solid line illustrating the temporal transition of the lateral acceleration Ay can be regarded to be same as the product of the average value Aave2 of the lateral acceleration and the temporal length T2 of the second section MM2, as indicated by the broken line in FIG. 6(a). Further, the area can be expressed by the following relational expression (Expression 8). In the relational expression (Expression 8), "Ap2" is the magnitude of the minimum value of the lateral acceleration of the vehicle at the second section MM2, "Ac" is the lateral acceleration of the vehicle at the start time of the second section MM2, and "Ae" is the lateral acceleration of the vehicle at the termination time of the second section MM2. In the examples illustrated in FIGS. 5 and 6, the lateral acceleration Ae of the vehicle at the termination time of the second section MM2 is equal to the lateral acceleration Ac (=A0) of the vehicle at the start time of the second section MM2.

[Formula 4]

$$Aave2 = \frac{2 \times (Y2 - Y1 - V_y1 \cdot T2)}{T2^2} \quad \text{(Expression 7)}$$

$$Aave2 \cdot T2 = (Ac + Ap2) \cdot \frac{T2}{2} \cdot \frac{1}{2} + (Ap2 + Ae) \cdot \frac{T2}{2} \cdot \frac{1}{2} \quad \text{(Expression 8)}$$

Incidentally, when the information specifying the final posture angle θend is not input, the product of the average value Aave2 of the lateral acceleration and the temporal length T2 of the second section MM2 is equal to the product of the average value Aave1 of the lateral acceleration and the temporal length T1 of the first section MM1. On the other hand, when information specifying the final posture angle θend is input and the final posture angle θend is different from the posture angle θ of the current time of the vehicle, the product of the average value Aave2 of the lateral acceleration and the temporal length T2 of the second section MM2 is different from the product of the average value Aave1 of the lateral acceleration and the temporal length T1 of the first section MM1.

The above relational expression (Expression 8) can be converted into the following relational expression (Expression 9). Further, since the lateral position Y0 of the current position of the vehicle C0, the lateral position Y1 of the transit position, the lateral speed Vy0 of the vehicle C0 at the present moment, and the temporal length T1 of the first section MM1 can already be grasped, it is possible to obtain the average value Aave1 of the lateral acceleration at the first section MM1, using the relational expression (Expression 4). Further, by substituting the lateral speed Vy0 wt the current time of the vehicle C0, the temporal length T1 of the first section MM1, and the average value Aave1 of the lateral acceleration at the first section MM1 to the relational expression (Expression 10) illustrated below, it is possible to obtain the lateral speed Vy1 at the time when the vehicle C0 reaches the transit position (X1, Y1). Further, by substituting the lateral position Y1 of the acquired transit position, the lateral position Y2 of the target position, the temporal length T2 of the second section MM2, and the lateral speed Vy1 of the vehicle at the transit position (X1, Y1) to the relational expression (Expression 9), the minimum value Ap2 of the lateral acceleration of the vehicle at the second section MM2, that is, the required value of the lateral acceleration at the fourth timing t14 is obtained.

[Formula 5]

$$|Ap2| = \frac{4 \times (Y2 - Y1 - V_y1 \cdot T2)}{T2^2} - \frac{1}{2} \cdot (Ac - Ae) \quad \text{(Expression 9)}$$

$$V_y1 = V_y0 + Aave1 \cdot T1 \quad \text{(Expression 10)}$$

In this way, by obtaining the maximum value Ap1 and the minimum value Ap2 of the lateral acceleration in the execution period MM, it is possible to obtain an increase aspect of the lateral acceleration Ay from the first timing t11 to the second timing t12, a decrease aspect of the lateral acceleration Ay from the second timing t12 to the fourth timing t14, and an increase aspect of the lateral acceleration Ay from the fourth timing t14 to the fifth timing t15. At this time, the maps illustrated in FIGS. 3(a) and 3(b) are used.

That is, for a while from the first timing t11, the amount of increase of the lateral acceleration per unit time gradually increases, using the map illustrated in FIG. 3(a). Also, slightly before the second timing t12, the amount of increase of the lateral acceleration per unit time gradually decreases, using the map illustrated in FIG. 3(b). Further, at the second timing t12, the amount of increase of the lateral acceleration per unit time becomes equal to "0 (zero)".

Also, for a while from the second timing t12, the amount of decrease of the lateral acceleration per unit time gradually increases, using the map illustrated in FIG. 3(a). The third timing t13 elapses and slightly before the fourth timing t14, the amount of decrease of the lateral acceleration per unit time gradually decreases, using the map illustrated in FIG. 3(b). Further, at the fourth timing t14, the amount of decrease of the lateral acceleration per unit time becomes equal to "0 (zero)". Further, in the period from the second timing t12 to the fourth timing t14, the amount of decrease of the lateral acceleration per unit time is the maximum at the third timing t13.

Also, for a while from the fourth timing t14, the amount of increase of the lateral acceleration per unit time gradually increases, using the map illustrated in FIG. 3(a). Slightly before the fifth timing t15, the amount of increase of the lateral acceleration per unit time gradually decreases, using the map illustrated in FIG. 3(b). Further, at the fifth timing t15, the amount of increase of the lateral acceleration per unit time becomes equal to "0 (zero)".

When the lateral acceleration profile PRAy is created in this way, step S14 illustrated in FIG. 4 is terminated, and the process proceeds to step S15.

Returning to FIG. 4, in step S15, the first integration unit 531 of the target deriving unit 53 integrates the lateral acceleration profile PRAy, thereby creating a lateral speed profile PRVy as illustrated in FIG. 6(b). In addition, "Vy2" in FIG. 6(b) is a predicted value of the lateral speed at the time when the vehicle C0 has moved to the target position (X2, Y2). In the next step S16, the second integration unit 532 of the target deriving unit 53 integrates the lateral speed profile PRVy, thereby deriving the target travel route RT as illustrated in FIG. 6(c). Further, the processing routine is temporarily terminated.

That is, in the present embodiment, the target travel route RT can be set by setting the target position (X2, Y2) in the application. Moreover, when setting the target travel route RT in this manner, there is no need to create candidates for a plurality of travel routes or to evaluate each candidate with a plurality of items. Therefore, it is possible to suppress an increase in computational load of the automatic drive control device 50 when setting the target travel route RT.

Further, the processing routine for setting the target travel route RT is executed every predetermined control cycle. Therefore, when an instruction to change the target position (X2, Y2) is input from the application such as the PCS unit 32, the target travel route RT from the current position (X0, Y0) of the vehicle C0 at the same time to the new target position (X2, Y2) is newly set. Since the computational load for setting the target travel route RT is low as described above, it is possible to set a new target travel route RT at an early stage. Therefore, it is possible to achieve more appropriate travel assist in accordance with the situation that changes every moment.

Further, in the vehicle driving assist device according to the present embodiment, even if the target position (X2, Y2) is not changed, even when the transit position (X1, Y1) or the final posture angle θend is changed, it is possible to reset the target travel route RT. Therefore, even when the transit position (X1, Y1) or the final posture angle θend changes, more appropriate travel assist can be achieved.

Next, referring to FIG. 7, the description will be given of a case where the transit position (X1, Y1) is set at a position different from the middle between the current position (X0, Y0) of the vehicle C0 and the target position (X2, Y2) in the vehicle front-rear direction. In such a case, for example, it is possible to provide a case where a plurality of obstacles is present in front of the vehicle C0 and a target travel route RT is derived to avoid each obstacle.

Figure 7A:
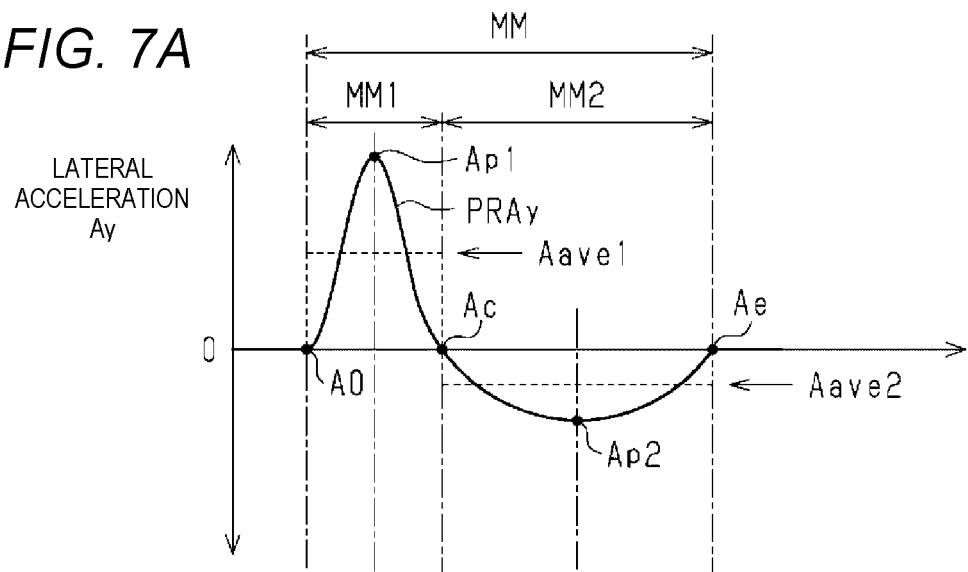
FIG. 7(a) is a diagram illustrating a lateral acceleration profile created when causing the vehicle to perform the lane change.
Figure 7B:
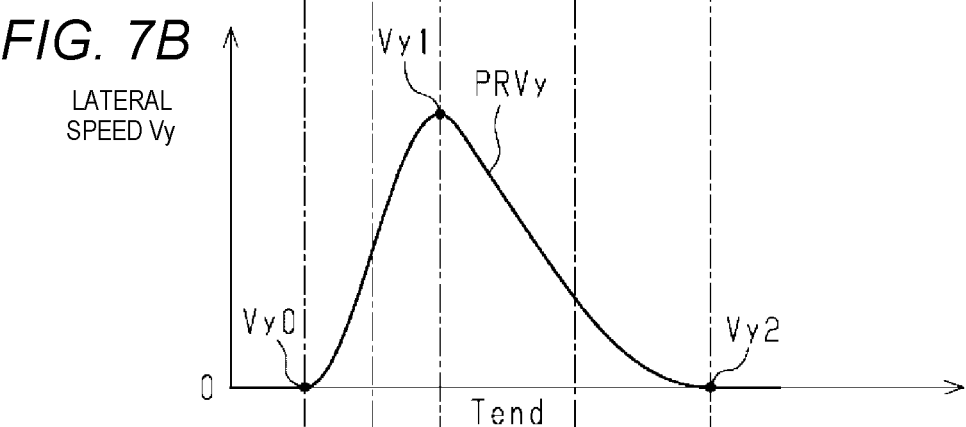
FIG. 7(b) is a diagram illustrating a lateral speed profile.
Figure 7C:
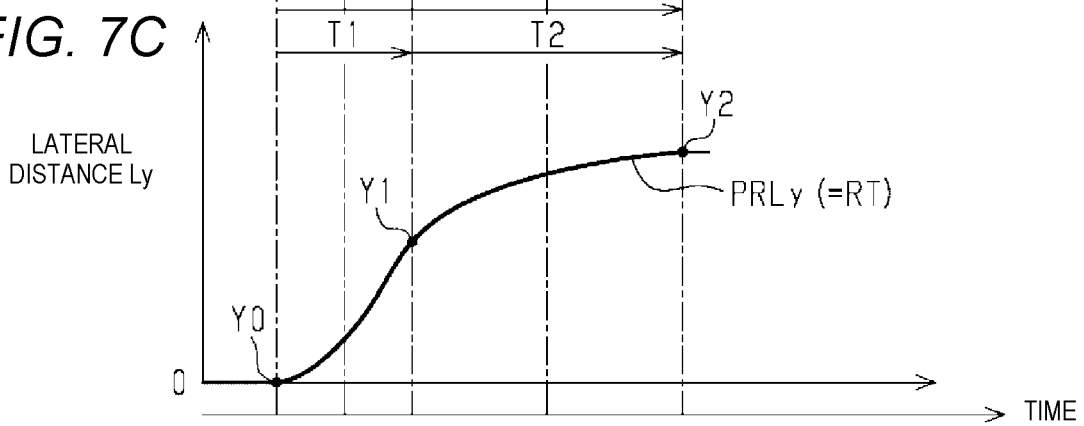
FIG. 7(c) is a diagram illustrating a lateral distance profile.

As illustrated in FIGS. 7(a), 7(b), and 7(c), when the transit position (X1, Y1) is closer to the current position (X0, Y0) of the vehicle C0 than the target position (X2, Y2) in the vehicle front-rear direction, "D" obtained using the relational expression (Expression 1) becomes smaller than "5". Therefore, by using the above relational expressions (Expression 2) and (Expression 3), the temporal length T1 of the first section MM1 becomes shorter than the temporal length T2 of the second section MM2. Further, the maximum value Ap1 of the lateral acceleration of the vehicle at the first section MM1 is obtained, using the relational expression (Expression 6), and the minimum value Ap2 of the lateral acceleration of the vehicle at the second section MM2 is obtained, using the relational expression (Expression 9). In this case, the absolute value of the maximum value Ap1 of the lateral acceleration of the vehicle at the first section MM1 becomes larger than the absolute value of the minimum value Ap2 of the lateral acceleration of the vehicle at the second section MM2.

Subsequently, a rough pattern of the lateral acceleration profile from the current time to the arrival prediction time Tend is set. The profile pattern in this case is the same as in the example illustrated in FIGS. 5 and 6. Further, the lateral acceleration profile PRAy illustrated in FIG. 7(a) is created by correcting the change aspect of the lateral acceleration Ay based on the profile pattern, using the map illustrated in FIGS. 3(a) and 3(b). Subsequently, by integrating the lateral acceleration profile PRAy, a lateral speed profile PRVy illustrated in FIG. 7(b) is created, and by integrating the lateral speed profile PRVy, a lateral distance profile PRLy illustrated in FIG. 7(c), that is, the target travel route RT is derived. By substituting the transit position (X1, Y1) as described above, even if the target position (X2, Y2) is the same, different target travel route RT is derived. Therefore, by setting the transit position (X1, Y1) as appropriate by the application, it is possible to enhance the degree of freedom of setting of the target travel route RT.

Figure 8:
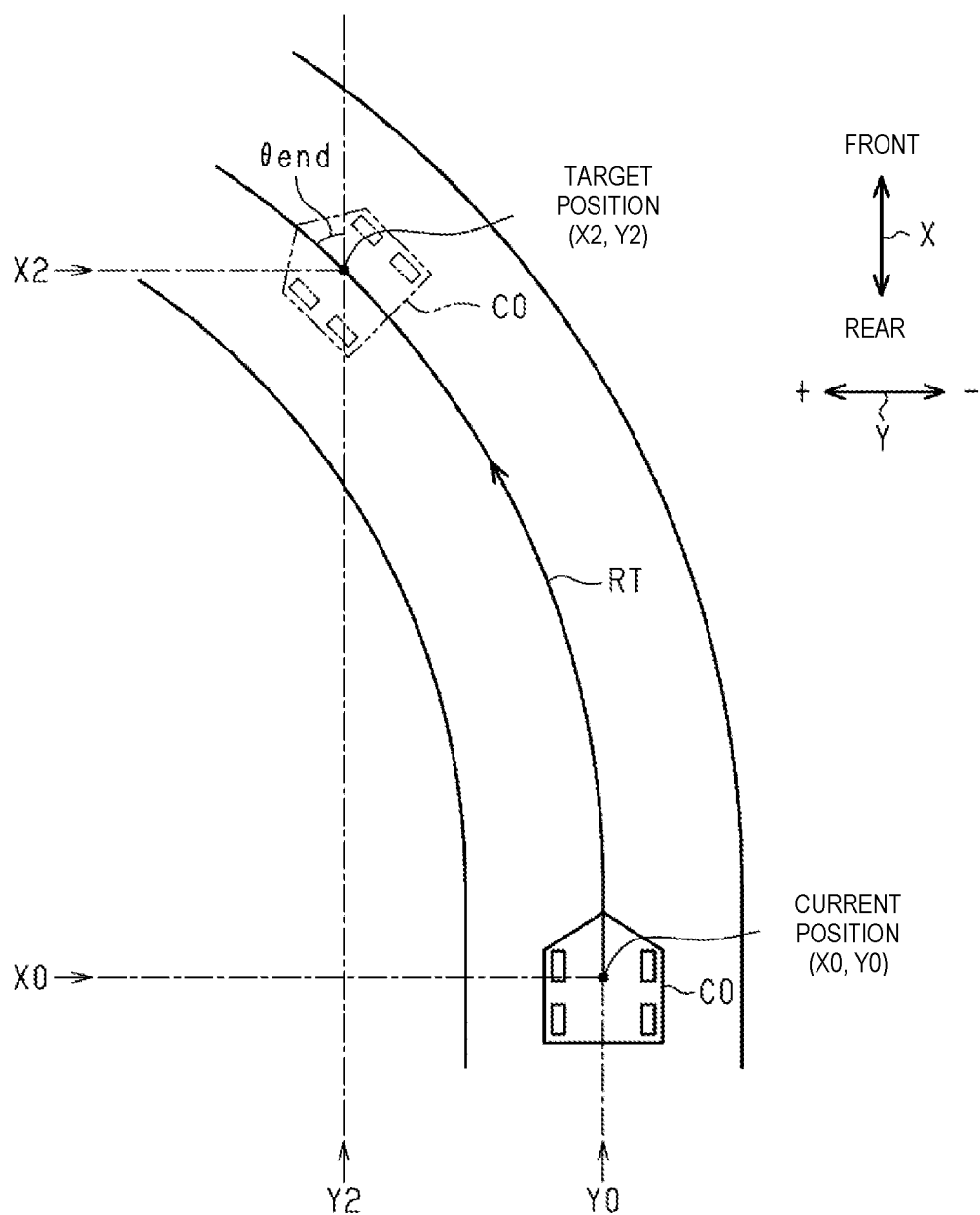
FIG. 8 is a schematic diagram illustrating a target travel route for causing the vehicle to perform a lane keep.

Next, the setting of the target travel route RT when the road on which the vehicle C0 travels curves forward will be described with reference to FIGS. 8 and 9. In this case, although the transit position (X1, Y1) is not set, the final posture angle θend is assumed to be set by the application.

In this case, since the transit position (X1, Y1) is regarded to be the same as the target position (X2, Y2), "D" becomes "10" by using the relational expression (Expression 1). Therefore, "T1" in the relational expression (Expression 2) is "Tend", and "T2" in the relational expression (Expression 3) is equal to "0 (zero)".

The profile pattern adopted as a rough pattern of the lateral acceleration profile from the current time to the arrival prediction time Tend is different from the example illustrated in FIGS. 6 and 7. That is, the profile pattern in this case is a shape that maintains the lateral acceleration Ay after enhancing the lateral acceleration Ay. Therefore, when computing "Ap1" using the relational expression (Expression 6), the lateral position Y2 of the target position is substituted for "Y 1", and the lateral acceleration at the time when the vehicle reaches the target position (X2, Y2), that is, the lateral acceleration Ac illustrated in FIG. 9 can be regarded to be equal to "Ap1". Further, "Ap1" obtained in this manner can be regarded as the maximum value of the lateral acceleration Ay in the execution period MM.

Figure 9A:
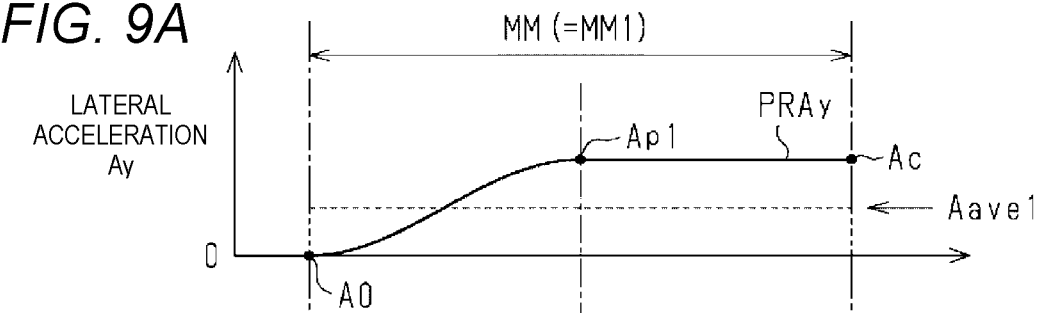
FIG. 9(a) is a diagram illustrating a lateral acceleration profile created when the vehicle is caused to perform the lane keep.

When the maximum value Ap1 of the lateral acceleration Ay in the execution period MM is thus obtained, the change aspect of the lateral acceleration Ay based on the profile pattern is corrected using the map illustrated in FIGS. 3(a) and 3(b), and thus, the lateral acceleration profile PRAy illustrated in FIG. 9(a) is created. That is, the lateral acceleration profile PRAy has a shape in which the lateral acceleration Ay is enhanced to the maximum value Ap1 computed using the above relational expression (Expression 6), and thereafter the lateral acceleration Ay is held in the maximum value Ap1.

Figure 9B:
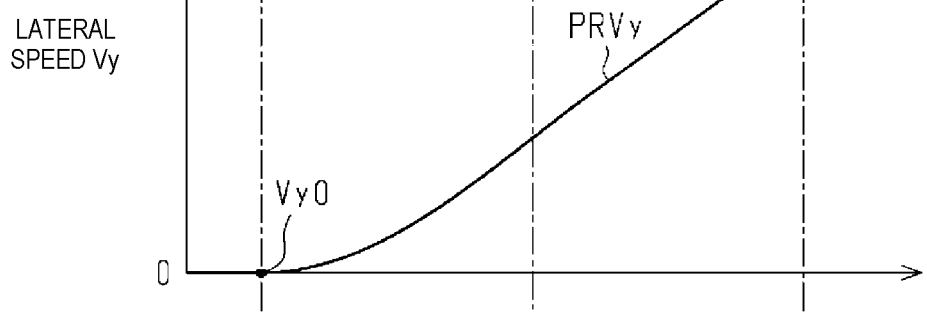
FIG. 9(b) is a diagram illustrating a lateral speed profile.
Figure 9C:
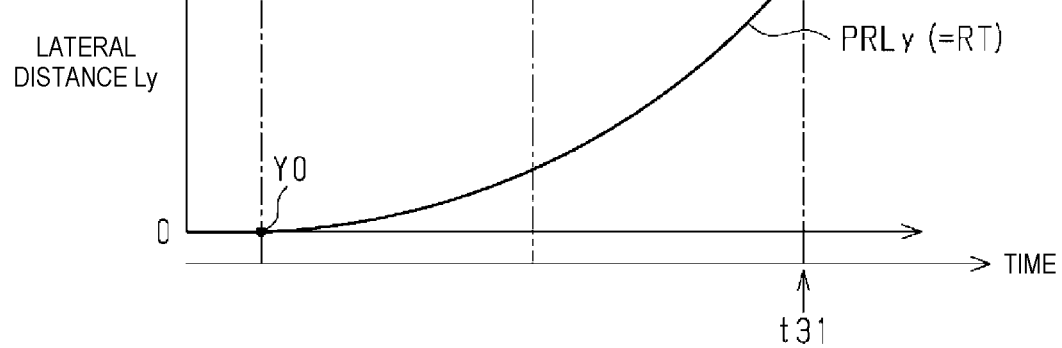
FIG. 9(c) is a diagram illustrating a lateral distance profile.

Further, by integrating the lateral acceleration profile PRAy, a lateral speed profile PRVy illustrated in FIG. 9(b) is created, and by integrating the lateral speed profile PRVy, the lateral distance profile PRLy illustrated in FIG. 9(c), that is, the target travel route RT is derived. In this case, the lateral speed Vy is generated in the vehicle at the first timing t31 at which the vehicle C0 has reached the target position (X2, Y2). The lateral speed Vy at this time becomes a speed corresponding to the final posture angle θend which is set by the application.

Therefore, when the final posture angle θend is set by the application, it is possible to set the target travel route RT such that the posture angle θ of the vehicle at the time at which the vehicle C0 has reached the target position (X2, Y2) is substantially equal to the final posture angle θend. That is, by setting the final posture angle θend by application, the degree of freedom of setting of the target travel route RT can be enhanced.

Next, referring to FIGS. 10 to 13, setting of the target travel route RT in a case where a plurality of (two in this case) transit positions is set by the application between the current position (X0, Y0) of the vehicle C0 and the target position (X2, Y2) will be described. Among the two transit positions, a transit position closer to the current position (X0, Y0) is defined as a first transit position (X11, Y11), and a transit position away from the current position (X0, Y0) is defined as a second transit position (X12, Y12).

For example, as a method for setting the target travel route RT in an aspect of moving the vehicle C0 in the lateral direction earlier in a state in which only one transit position is set, as described above, it is possible to adopt a method of setting the transit position in the vicinity of the current position in the vehicle front-rear direction as mentioned above. In this case, as the transit position is closer to the current position, it is easy to set the target travel route RT so as to enforce the abrupt change in the posture angle θ with respect to the vehicle C0 from the current position to the transit position, that is, an abrupt course change. The broken line illustrated in FIG. 10 indicates the target travel route RTA in the aspect of reaching the target position (X2, Y2) from the current position (X0, Y0) via the first transit position (X11, Y11), when only the first transit position (X11, Y11) is set.

Figure 10:
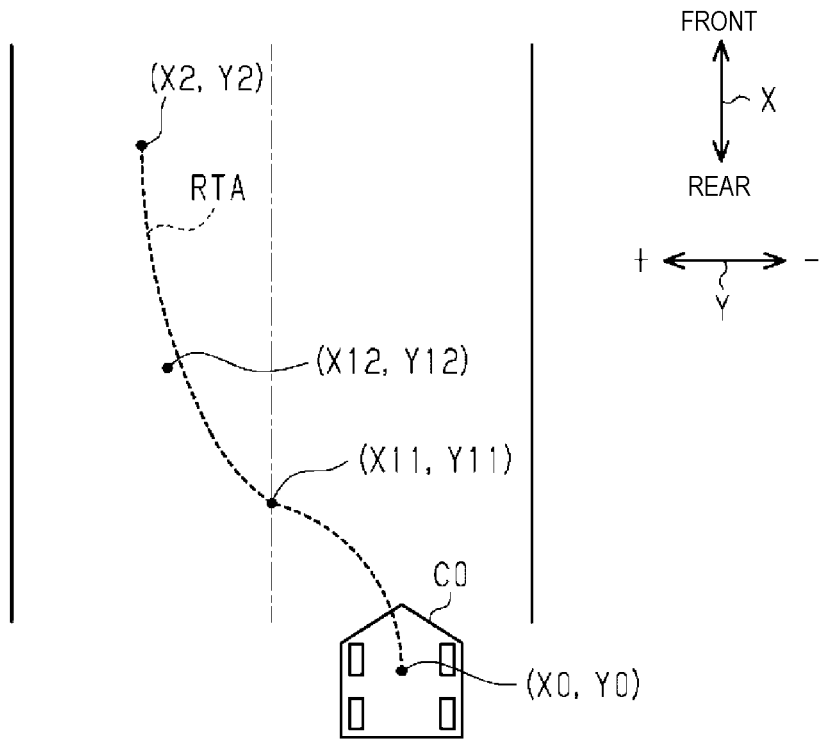
FIG. 10 is a schematic diagram illustrating positional relations between a current position of the vehicle, a first transit position, a second transit position, and a target position in a case where two transit positions are set.

Further, when there is a possibility of forcing the vehicle C0 to suddenly change the course, as illustrated in FIG. 10, in addition to the first transit position (X11, Y11), the second transit position (X12, Y12) may be set by the application laterally outer side (on the left side in FIG. 10) than the target travel route RTA.

Figure 11:
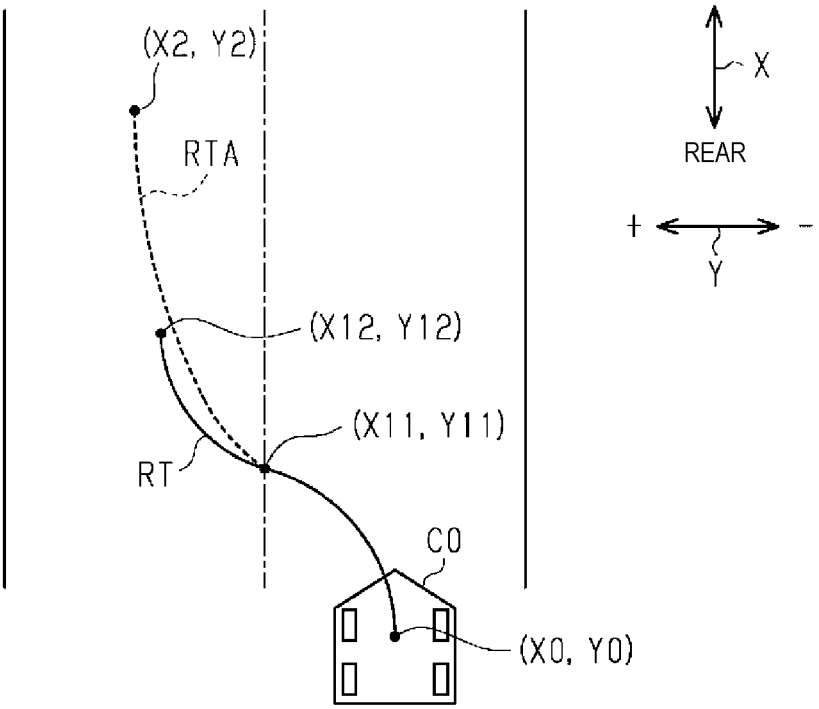
FIG. 11 is a schematic diagram illustrating a target travel route for allowing the vehicle to reach the second transit position via the first transit position, in a case where two transit positions are set.

In this case, in the automatic drive control device 50, the second transit position (X12, Y12) separated from the current position (X0, Y0) among the respective transit positions in the vehicle front-rear direction (vertical direction in the drawing) is set as a temporary target position. Further, as illustrated in FIG. 11, the target travel route RT in an aspect of reaching the second transit position (X12, Y12) from the current position (X0, Y0) via the first transit position (X11, Y11) is set. In this case, the target travel route RT as indicated by the solid line in FIG. 11 can be set by the same method as described with reference to FIGS. 6 and 7.

That is, the time required for moving the vehicle C0 from the current position (X0, Y0) to the second transit position (X12, Y12) is estimated from the positional relations between the second transit position (X12, Y12) and the target position (X2, Y2), and the estimated time can be regarded as the arrival prediction time. By appropriately substituting the arrival prediction time for each of the above relational expressions, the target travel route RT as indicated by the solid line in FIG. 11 can be set.

When such a target travel route RT is set, the yawing motion of the vehicle C0 is controlled so that the vehicle C0 travels along the target travel route RT.

Figure 12:
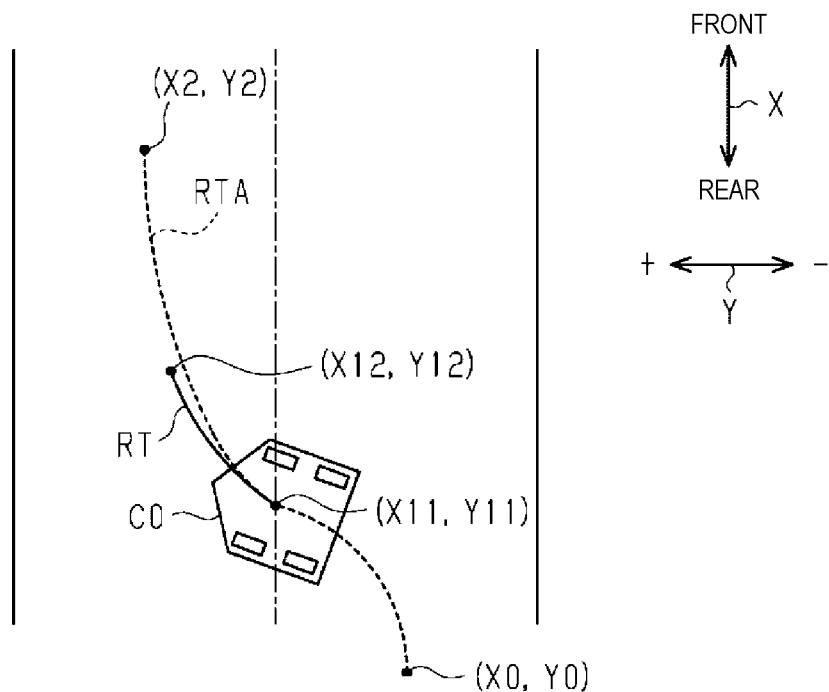
FIG. 12 is a schematic diagram illustrating a target travel route from the first transit position to the second transit position, which is created when the vehicle reaches the first transit position in a case where two transit positions are set.

Further, as illustrated in FIG. 12, when the vehicle C0 reaches the first transit position (X11, Y11), the target travel route RT is reset in the automatic drive control device 50. That is, when the vehicle C0 reaches the first transit position (X11, Y11), the first transit position (X11, Y11) can be regarded as the current position of the vehicle C0. Further, as indicated by the solid line in FIG. 12, the target travel route RT from the first transit position (X11, Y11) to the second transit position (X12, Y12) which is the temporary target position is derived. At this time, it is possible to derive the target ravel route RT, on the basis of the lateral positional relation between the second transit position (X12, Y12) and the target position (X2, Y2) relative to the first transit position (X11, Y11), and the final posture angle corresponding to the deviation between the posture angle θ of the vehicle C0 at the first transit position (X11, Y11) and the predicted value of the posture angle of the vehicle C0 at the second transit position (X12, Y12).

In this case, it is possible to set the target travel route RT as indicated by the solid line in FIG. 12 by the same method as described with reference to FIG. 9. That is, by substituting the lateral position Y11 of the first transit position for the lateral position of the current position, and by substituting the lateral position Y12 of the second transit position for the lateral position of the target position, it is possible to set the target travel route RT as illustrated by the solid line in FIG. 12.

When such a target travel route RT is set, the yawing motion of the vehicle C0 is controlled so that the vehicle C0 travels along the target travel route RT.

Figure 13:
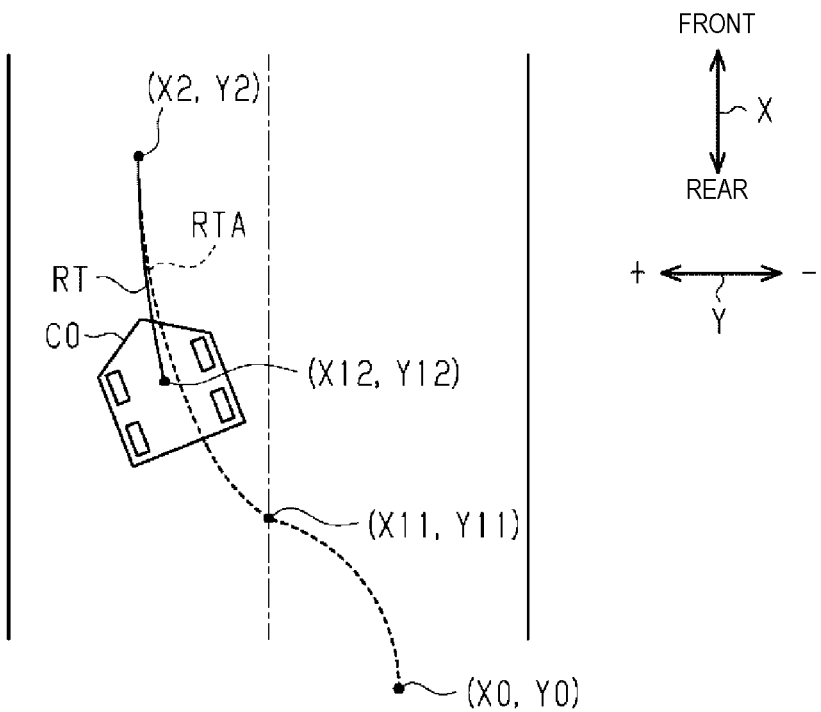
FIG. 13 is a schematic diagram illustrating a target travel route from the second transit position to the target position, which is created when the vehicle reaches the second transit position, in a case where two transit positions are set.

Further, as illustrated in FIG. 13, when the vehicle C0 reaches the second transit position (X12, Y12), the target travel route RT is reset in the automatic drive control device 50. That is, when the vehicle C0 reaches the second transit position (X12, Y12), the second transit position (X12, Y12) can be regarded as the current position of the vehicle C0. Further, as indicated by the solid line in FIG. 13, the target travel route RT from the second transit position (X12, Y12) to the target position (X2, Y2) is derived. At this time, it is possible to derive the target travel route RT, on the basis of the lateral positional relation of the target position (X2, Y2) with respect to the second transit position (X12, Y12), and the final posture angle corresponding to the deviation between the posture angle θ of the vehicle C0 at the transit position (X12, Y12) and the final posture angle θend at the target position (X2, Y2).

Further, in this case, it is possible to set the target travel route RT as indicated by the solid line in FIG. 13 by the same method as described with reference to FIG. 9. That is, by substituting the lateral position Y12 of the second transit position for the lateral position of the current position, it is possible to set the target travel route RT as indicated by the solid line in FIG. 13.

When such a target travel route RT is set, the yawing motion of the vehicle C0 is controlled so that the vehicle C0 travels along the target travel route RT.

Further, the above embodiment may be modified to another embodiment as described below.

In the above embodiment, a case where information specifying the arrival prediction time Tend is input from an application such as the PCS unit 32 is described. However, when the information is not input from the application, the automatic drive control device 50 may obtain the arrival prediction time Tend by computation, create the lateral acceleration profile PRAy using the computation result, and derive the target travel route RT by integrating the lateral acceleration profile PRAy twice.

The arrival prediction time Tend in a case where there is an obstacle in front of the vehicle C0 can be computed, using the distance from the vehicle C0 to the obstacle, the relative speed based on the obstacle, and the front-rear acceleration (front-rear deceleration) of the vehicle C0.

Further, it is possible to compute the arrival prediction time Tend when executing the LKA, which causes the vehicle C0 to travel along the curved road (lane), using the linear distance between the boundary portion of the lane located in front of the vehicle C0 in the advancing direction and the vehicle C0, the relative speed based on the boundary portion, and the front-rear acceleration (front-rear deceleration) of the vehicle C0.

In the above embodiment, although information specifying the target position (X2, Y2) is input from the application for assist control, when information specifying the transit position (X1, Y1) is not input, the lateral acceleration profile PRAy which increases the lateral acceleration Ay and then decreases the lateral acceleration Ay, or a lateral acceleration profile PRAy which decreases the lateral acceleration Ay and then increases the lateral acceleration Ay is created.

When information specifying the target position (X2, Y2) and information specifying the transit position (X1, Y1) are input from the application, a lateral acceleration profile PRAy of the aspect in which the following (A), (B), and (C) are established is created.

(A) The vehicle reaches the transit position (X1, Y1) after obtaining the period of increasing the lateral acceleration Ay and the period of decreasing the lateral acceleration Ay in order. (Or, the vehicle reaches the transit position (X1, Y1) after obtaining the period of decreasing the lateral acceleration Ay and the period of increasing the lateral acceleration Ay in order.)

(B) The lateral acceleration Ac at the time when the vehicle reaches the transit position (X1, Y1) is made to be equal to the lateral acceleration A0 at the current time.

(C) A period of decreasing the lateral acceleration Ay and a period of increasing the lateral acceleration Ay are obtained in order until the vehicle C0 reaches the target position (X2, Y2) from the transit position (X1, Y1). (Or a period of increasing the lateral acceleration Ay and a period of decreasing the lateral acceleration Ay are obtained in order until the vehicle C0 reaches the target position (X2, Y2) from the transit position (X1, Y1)).

That is, a rough pattern (profile pattern) of the lateral acceleration profile is determined depending on whether or not the transit position (X1, Y1) is set. However, the invention is not limited thereto, and the profile pattern may be determined by another method. For example, the profile pattern may be determined by the type of application that inputs the information specifying the target position (X2, Y2) to the automatic drive control device 50. Even with this configuration, as in the above embodiment, it is possible to set an appropriate target travel route RT according to the purpose.

The parameter relating to the amount of change in the lateral acceleration of the vehicle stored in the storage unit 51 may be another parameter other than the limit value AyL of the amount of change in the lateral acceleration, as long as the parameter can be used for creating the lateral acceleration profile PRAy.

In the above-described embodiment, the posture control of the vehicle along the target travel route RT is achieved, by controlling the difference in braking force between the left and right wheels of the vehicle and by adjusting the yawing moment of the vehicle. However, the invention is not limited thereto, as long as the posture angle θ of the vehicle can be changed, the posture control may be achieved by a method different from the above method. For example, other methods include a method of adjusting the yawing moment of the vehicle, by controlling the steering angle of the front wheels of the vehicle, and a method of adjusting the yawing moment of the vehicle by controlling the steering angle of the rear wheels of the vehicle. Furthermore, at least two of the control of the difference in braking force between the left wheel and the right wheel, the control of the steering angle of the front wheel of the vehicle, and the control of the steering angle of the rear wheel of the vehicle are performed to adjust the yawing moment of the vehicle, and thus, the posture angle of the vehicle may be controlled.

Even when the vehicle C0 does not perform the automatic driving, when the information specifying the target position (X2, Y2) is input to the automatic drive control device 50 from the application, a lateral acceleration profile PRAy may be created, and the target travel route RT may be derived by integrating the lateral acceleration profile PRAy twice. Further, the target travel route RT may be guided to the driver of the vehicle.

Next, technical ideas capable of being grasped from the above embodiment and another embodiment will be described below.

In a case where the period of increasing the lateral acceleration of the vehicle is defined as the increasing period, and the period of decreasing the lateral acceleration is set as the decreasing period, when the information specifying the target position and the information specifying the transit position are input, the profile creation unit is preferable to create a lateral acceleration profile in the aspect in which the vehicle reaches the transit position by obtaining one of the increasing period and the decreasing period and then obtaining the other period, and thereafter, the vehicle reaches the target position by obtaining the other period and then obtaining the one period.

(b) When the information specifying the transit position is input, the profile creation unit is preferable to create a lateral acceleration profile in the aspect in which the lateral acceleration of the vehicle at the time when the vehicle reaches the transit position becomes equal to the lateral acceleration of the vehicle at the current time.

(c) When the information specifying the final posture angle different from the posture angle of the vehicle of the current time is input, the profile creation unit is preferable to create the lateral acceleration profile so that the lateral speed of the vehicle at the time when the vehicle reaches the target position is different from the lateral speed of the vehicle at the current time.

The invention claimed is:

1. A vehicle travel assist device that sets a target travel route of a vehicle to a target position different from the vehicle in a lateral direction of the vehicle, the vehicle travel assist device comprising:

a storage unit which stores a parameter relating to an amount of change in a lateral acceleration of the vehicle;

a profile creation unit which creates a lateral acceleration profile indicating a relation between the lateral acceleration of the vehicle and time, on the basis of the target position, an arrival prediction time which is a predicted value of the time required for the vehicle to reach the target position, and the parameter stored in the storage unit, when information specifying the target position is input; and a target deriving unit which integrates the lateral acceleration profile twice to derive a target travel route up to the target position, wherein, when the information specifying the target position and information specifying a final posture angle of the vehicle which is a posture angle of the vehicle at the time when the vehicle reaches the target position are input, the profile creation unit creates the lateral acceleration profile, on the basis of the target position, the final posture angle, the arrival prediction time, and the parameter stored in the storage unit, and the target deriving unit derives the target travel route in an aspect in which the posture angle of the vehicle reaching the target position becomes the final posture angle, by integrating the lateral acceleration profile created by the profile creation unit twice.

2. The vehicle travel assist device according to claim 1, wherein, when the information specifying the target position and information specifying the transit position located between the vehicle and the target position are input, the profile creation unit creates the lateral acceleration profile in an aspect in which a percentage of predicted time which is a predicted value of the time required for the vehicle to reach the transit position among a plurality of the arrival prediction time is smaller, as the transit position is closer to a current position of the vehicle in a vehicle front-rear direction and, the target deriving unit derives the target travel route in an aspect in which the vehicle reaches the target position via the transit position, by integrating the lateral acceleration profile created by the profile creation unit twice.

3. The vehicle travel assist device according to claim 2, wherein, when information indicating a change in the target position is input under a condition that the vehicle traveling along the target travel route derived by the target deriving unit has not yet reached the target position, the profile creation unit creates the lateral acceleration profile, on the basis of the target position after the change, the arrival prediction time which is a predicted value of the time required for the vehicle to reach the target position after the change, and the parameter stored in the storage unit.

4. The vehicle travel assist device according to claim 1, wherein, when information indicating a change in the target position is input under a condition that the vehicle traveling along the target travel route derived by the target deriving unit has not yet reached the target position, the profile creation unit creates the lateral acceleration profile, on the basis of the target position after the change, the arrival prediction time which is a predicted value of the time required for the vehicle to reach the target position after the change, and the parameter stored in the storage unit.

* * * * *